United States Patent
Kojiya et al.

(10) Patent No.: US 11,427,244 B2
(45) Date of Patent: Aug. 30, 2022

(54) STEERING COLUMN DEVICE

(71) Applicant: NSK LTD., Tokyo (JP)

(72) Inventors: Nobuhiro Kojiya, Maebashi (JP);
Arata Urimoto, Maebashi (JP);
Masaya Johta, Maebashi (JP); Seiichi Moriyama, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 17/287,223

(22) PCT Filed: Oct. 24, 2019

(86) PCT No.: PCT/JP2019/041614
§ 371 (c)(1),
(2) Date: Apr. 21, 2021

(87) PCT Pub. No.: WO2020/085411
PCT Pub. Date: Apr. 30, 2020

(65) Prior Publication Data
US 2021/0387663 A1    Dec. 16, 2021

(30) Foreign Application Priority Data

Oct. 24, 2018  (JP) .............................. JP2018-200403

(51) Int. Cl.
*B62D 1/19*    (2006.01)

(52) U.S. Cl.
CPC .................................. *B62D 1/192* (2013.01)

(58) Field of Classification Search
CPC ......... B62D 1/192; B62D 1/195; F16F 7/123; F16F 7/125; F16F 7/128
See application file for complete search history.

(56) References Cited

U.S. PATENT DOCUMENTS

| | | | | |
|---|---|---|---|---|
| 10,597,065 B2* | 3/2020 | Kurokawa | ............. | B62D 1/189 |
| 10,807,630 B2* | 10/2020 | Caverly | ................ | B62D 1/192 |
| 11,040,737 B2* | 6/2021 | Strong | ................... | B62D 1/187 |
| 2009/0218801 A1 | 9/2009 | Park | | |
| 2017/0113710 A1 | 4/2017 | Matsuno et al. | | |
| 2018/0222519 A1 | 8/2018 | Johta et al. | | |

FOREIGN PATENT DOCUMENTS

| | | |
|---|---|---|
| JP | 2017-081214 A | 5/2017 |
| JP | 2018-131059 A | 8/2018 |
| WO | 2016/114034 A1 | 7/2016 |

OTHER PUBLICATIONS

International Search Report for PCT/JP2019/041614 dated, Dec. 17, 2019.

* cited by examiner

*Primary Examiner* — Drew J Brown
(74) *Attorney, Agent, or Firm* — Sughrue Mion, PLLC

(57) ABSTRACT

A support bracket is arranged inside a slit of an outer column and joined to the inner column so as to be able to detach due to an impact load applied to the inner column at the time of a secondary collision. A base portion of an impact absorbing member is attached to the inner column so as to displace together with the inner column when the inner column displaces toward the front, and a folded portion of the impact absorbing member is made to face a jerking portion of the support bracket in the front-rear direction.

14 Claims, 18 Drawing Sheets

(A)

(B)

STEERING COLUMN DEVICE

CROSS REFERENCE TO RELATED APPLICATIONS

This application is a National Stage of International Application No. PCT/JP2019/041614 filed Oct. 24, 2019, claiming priority based on Japanese Patent Application No. 2018-200403 filed Oct. 24, 2018.

TECHNICAL FIELD

The present invention relates to a steering column device for rotatably supporting a steering shaft that supports a steering wheel.

BACKGROUND ART

FIG. 18 illustrates an example of a steering device for an automobile. The rotation of a steering wheel 1 is transmitted to a steering gear unit 5 via a steering shaft 2, a universal joint 3, an intermediate shaft 4 and the like, and is converted to linear motion by the steering gear unit 5. Steered wheels 7 are given a steering angle by pushing and pulling left and right tie rods 6 by the linear motion of the steering gear unit 5. The steering shaft 2 is rotatably supported with respect to a vehicle body via a steering column device 8.

The pamphlet of WO2016/114034 describes the arrangement of a steering column device that includes a tilt-telescopic mechanism for enabling adjustment of the position of a steering wheel, and an impact absorbing mechanism to alleviate an impact load applied to a driver's body in the event of a secondary collision. In this steering device, the steering shaft is configured so that the entire length may be expanded or contracted by combining an inner shaft and an outer shaft, and the steering column is configured so that the entire length may be expanded or contracted by fitting together the rear-side portion of a front side outer column with the front-side portion of a rear side inner column so as to be able to displace in the axial direction. Moreover, an inner-column bracket is joined and fixed to the lower surface of the front-side portion of the inner column by a shear pin made of synthetic resin. At the time of a secondary collision, the shear pin is sheared when a large impact load is applied in the forward direction to the inner column from the steering wheel via the steering shaft. As a result, the steering wheel is allowed to displace toward the front, and the impact load applied to the driver's body is alleviated.

CITATION LIST

Patent Literature

[Patent Literature 1] Pamphlet WO 2016/114034

SUMMARY OF INVENTION

Technical Problem

In a steering column device provided with an impact absorbing mechanism, it is preferable to appropriately increase the absorbed amount of impact load applied to the steering wheel in the event of a secondary collision, and in this regard, there is room for improvement of the steering column device described in Pamphlet WO 2016/114034.

In view of the circumstances described above, an object of the present invention is to achieve a structure of a steering column device that may easily increase the absorbed amount of impact load that is applied to a steering wheel during a secondary collision.

Solution to Problem

The steering column device of one aspect of the present invention includes an inner column, an outer column, a vehicle-body-side bracket, an adjusting rod, a pair of pressing portions, an expansion/contraction mechanism, a telescopic friction plate, a support bracket, and an impact absorbing member.

A front-side portion of the inner column is internally fitted in a rear-side portion of the outer column. The outer column has a slit that extends in an axial direction, a pair of sandwiched portions arranged at positions sandwiching the slit from both sides in a width direction, and a pair of column-side through holes that penetrate each of the pair of sandwiched portions in the width direction.

The vehicle-body-side bracket has a pair of support plate portions that sandwich the pair of sandwiched portions, and a pair of vehicle-body-side through holes provided in portions of the pair of support plate portions that are aligned with each other.

The adjusting rod is inserted through the pair of column-side through holes and the pair of vehicle-body-side through holes. The pair of pressing portions is arranged on portions of the adjusting rod that protrude from outside surfaces of the pair of support plate portions. The expansion/contraction mechanism expands or contracts a distance between the pair of pressing portions.

The telescopic friction plate is sandwiched in at least any of a portion between an inside surface of the pair of support plate portions and an outside surface of the pair of sandwiched portions, and a portion between an outside surface of the pair of support plate portions and an inside surface of the pair of pressing portions, and has a telescopic elongated hole through which the adjusting rod is inserted.

The support bracket has a mounting portion that is arranged inside the slit and is joined to the inner column so as to be able to detach due to an impact load that is applied to the inner column during a secondary collision, and a support arm portion that supports the telescopic friction plate, and a jerking portion that is provided on a surface facing a rear side.

The impact absorbing member is made of a wire material and has a base portion, a folded portion that is folded back to an outside in a radial direction of the inner column and to a front side from an end portion on the rear side of the base portion, and an extending portion that extends to the front side from an end portion of the folded portion on the outside in the radial direction of the inner column.

The base portion is attached to (fixed to or engaged with) the inner column so as to displace together with the inner column when the inner column displaces forward. The folded portion faces the jerking portion in the front-rear direction.

Preferably the steering column device of the present invention includes a restraining portion that restrains or holds the extending portion from the outside in the radial direction of the inner column and prevents the extending portion from being deformed outward in the radial direction of the inner column during a secondary collision. In this case, the support portion may be composed of a harness bracket that is supported by and fixed to the support bracket.

The outer column may include a concave portion in a portion of an inner-circumferential surface existing on the front side of the slit, the concave portion open to an end portion on the front side of the slit and recessed toward an outside in a radial direction of the outer column. In this case, the concave portion may have a first guiding surface on an end portion on the rear side that is inclined in a direction in which a depth dimension thereof becomes deeper going toward the rear side. Alternatively or additionally, the concave portion may have a second guiding surface on an end portion on the rear side that is inclined in a direction in which a width dimension increases going toward the rear side.

In the impact absorbing member, a configuration may be adopted in which the folded portion is composed of a pair of folded portions, and the extending portion is composed of a pair of extending portions, and end portions of the pair of folded portions on an inside in the radial direction of the inner column are connected by the base portion. In this case, a configuration may be adopted in which the inner column has notch portions at two positions in end portions on the front side that are separated in a circumferential direction thereof, the base portion of the impact absorbing member has a pair of bent portions that is bent at right angles from the end portions on the front side of the pair of folded portions, and a connecting portion that connects together end portions of the pair of bent portions, and the pair of bent portions engages with the notch portions.

The steering column device of the present invention may include an intermediate column in which an end portion on the rear side is fitted to an end portion on the front side of the outer column so that displacement rearward is not possible, and a lower column in which an end portion on the rear side is fitted to an end portion on the front side of the intermediate column so that displacement rearward is possible in a case where a rearward impact load is applied due to a primary collision.

Effect of Invention

With the steering column device of one aspect of the present invention, the absorbed amount of an impact load applied to a steering wheel at the time of a secondary collision may be made larger compared with a steering column device as described in the pamphlet of WO 2016/114034.

DESCRIPTION OF EMBODIMENTS

Figure 1:
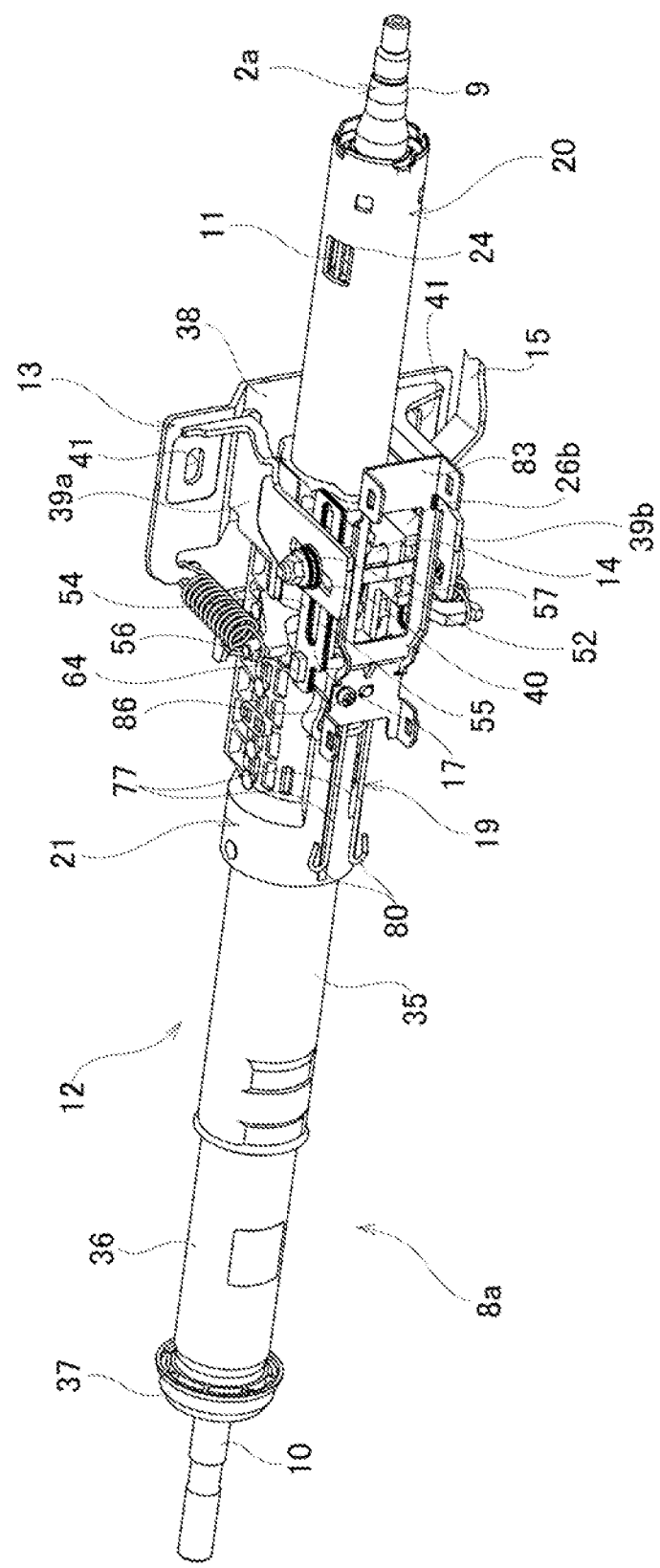
FIG. 1 is a perspective view of a steering column device of a first example of an embodiment of the present invention as viewed from the lower side and the rear side.

FIG. 1 to FIG. 17B illustrate an example of an embodiment of the present invention. A steering column device 8a of this example rotatably supports a steering shaft 2a by which a steering wheel 1 (see FIG. 18) is supported at the end portion on the rear side with respect to a vehicle body. The steering column device 8a of this example has a tilt-telescopic mechanism for adjusting the vertical position and the front-rear position of the steering wheel 1, and an impact absorbing mechanism for alleviating an impact load applied to a driver's body in the event of a secondary collision. Note that the vertical direction, the front-rear direction, and the width direction refer to the vertical direction, the front-rear direction, and the width direction in a state where the steering column device 8a is assembled in a vehicle, unless specified otherwise.

The steering shaft 2a has a structure in which an upper shaft 9 and a lower shaft 10 are combined so that torque may be transmitted by spline engagement or the like and the entire length may be expanded or contracted. The steering wheel 1 is supported by and fixed to the end portion on the rear side of the upper shaft 9. Note that, in this example, a key lock collar 11 of a steering lock device is externally fitted and fixed to an intermediate portion in the axial direction of the upper shaft 9.

The steering column device 8a includes a steering column 12, a vehicle-body-side bracket 13, an adjusting rod 14, an adjusting lever 15 and a cam device 16 of an expansion/contraction mechanism, a telescopic friction plate 17, a support bracket 18, and an impact absorbing member 19.

The steering column 12 is configured so that the entire length may be expanded or contracted by fitting the front-side portion of the inner column 20 on the rear side and the rear-side portion of the outer column 21 on the front side so that relative displacement is possible in the axial direction.

The inner column 20 has notch portions 22 opened in the end surface of the front side at two locations of the lower-side portion of the end portion of the front side that are separated in the circumferential direction, and through holes 23 at two location of the bottom surface of the front-side portion that are separated in the axial direction.

The inner column 20 of this example has a substantially rectangular locking through hole 24 in the rear-side portion. A lock unit (key lock cylinder) (not illustrated) is supported by and fixed to a surrounding portion of the locking through hole 24 on the outer-circumferential surface of the inner column 20. When the steering lock device is activated (when the key is locked), the lock pin of the lock unit is displaced toward the inside in the radial direction of the steering column 12 through the locking through hole 24, and by engaging with an engaging recess portion that is formed on the outer-circumferential surface of the key lock collar 11, it is possible to substantially prevent rotation of the steering shaft 2a.

The outer column 21 has a slit 25, a pair of sandwiched portions 26a, 26b, and a pair of column-side through holes 27.

The slit 25 is for allowing the inner diameter of the rear-side portion of the outer column 21 to be expanded or contracted, and is formed on the lower surface of the outer column 21 from an intermediate portion to the rear-side portion so as to extend in the axial direction. At the end portion on the front side of the slit 25, provided is a wide portion 28 having a width dimension larger than that of the portion existing on the rear side. In this example, the end portion on the rear side of the slit 25 is not opened on the end surface of the rear side of the outer column 21, but it may be opened. In this example, the slit 25 is formed on the lower surface of the outer column 21; however, it is also possible to form the slit on the upper surface of the outer column 21.

The pair of sandwiched portions 26a, 26b are arranged at positions that sandwich the rear-side portion of the slit 25 from both sides in the width direction. The pair of column-side through holes 27 are merely circular holes that are formed in portions of the pair of sandwiched portions 26a, 26b that are aligned with each other (in other words, arranged in the pair of sandwiched portions 26a, 26b so as to be coaxial with each other), and are formed so as to penetrate in the width direction through the pair of sandwiched portions 26a, 26b.

The outer column 21 further has a concave portion 29 in a portion of the inner-circumferential surface existing on the front side of the slit 25, with the end portion on the rear side open to the end portion of the front side of the slit 25, that extends in the axial direction. The concave portion 29 has a first guiding surface 30 at the end portion on the rear side. The first guiding surface 30 is inclined in a direction in which the depth dimension in the radial direction becomes deeper going toward the rear side, or in other words, it is inclined in a direction in which the thickness dimension of the outer column 21 becomes thinner. In this example, the concave portion 29 has a second guiding surface 88 at the end portion on the rear side. The second guiding surface 88 is inclined in a direction in which the width dimension becomes wider going toward the rear side. In this example, the end portion on the front side of the concave portion 29 is open to the end surface on the front side of the outer column 21.

The outer column 21 of this example has a fitting holding portion 31 on the inner-circumferential surface of the end portion on the front side having an inner-diameter dimension larger than that of a portion adjacent to the rear side, and a stepped portion 32 on the end portion on the rear side of the fitting holding portion 31 that face the front side. Furthermore, the outer column 21 has a rotation prevention slit 33 extending in the axial direction on the upper surface from the front-side portion to the rear-side portion. Note that the end portions on both the front and rear sides of the rotation prevention slit 33 are not opened on the end surfaces of both the front and rear sides the outer column 21. In other words, the rotation prevention slit 33 is an elongated hole extending in the axial direction.

In this example, in a state in which the front-side portion of the inner column 20 and the rear-side portion of the outer column 21 are fitted together such that relative displacement in the axial direction is possible, a rotation prevention member 34 that is supported by and fixed to the upper surface of the inner column 20 is arranged inside the rotation prevention slit 33 so that there is no looseness in the width direction and so that relative displacement in the axial direction is possible. As a result, relative rotation between the inner column 20 and the outer column 21 is prevented. Note that details of the rotation prevention mechanism including the rotation prevention slit 33 and the rotation prevention member 34 are described in Pamphlet WO 2016/114034, and are not related to the gist of the present invention, and are therefore omitted. Moreover, in a case where it is possible to prevent relative rotation between the inner column 20 and the outer column 21 by another method, the rotation prevention mechanism may be omitted.

The steering column 12 of this example further includes an intermediate column 35 and a lower column 36. In a state in which the end surface of the rear side of the intermediate column 35 is in contact with the stepped portion 32 of the outer column 21, the rear-side portion is internally fitted and fixed in the fitting support portion 31 of the outer column 21 by an interference fit. The end portion on the rear side of the lower column 36 is internally fitted into the end portion on the front side of the intermediate column 35 such that relative displacement in the axial direction is possible. Therefore, as will be described later, the steering column 12 of this example is configured such that when a load directed toward the rear is applied to the lower column 36 due to a primary collision, the lower column 36 displaces toward the rear with respect to the intermediate column 35.

The end portion on the front side of the steering column 12 is supported so as to swing in the vertical direction with respect to the vehicle body. More specifically, as illustrated in FIG. 1, an annular bushing 37 made of an elastic member such as an elastomer including rubber or synthetic resin is externally fitted and fixed to the end portion of the front side of the lower column 36, and the bushing 37 is internally fitted and fixed in a joint hole formed in the vehicle body. As a result, the end portion on the front side of the steering column 12 is supported so as to be able to swing in the vertical direction with respect to the vehicle body within a range in which the bushing 37 may be elastically deformed.

The steering shaft 2a is configured by rotatably supporting the rear-side portion of the upper shaft 9 by the end portion on the rear side of the inner column 20 via a rolling bearing, and by rotatably supporting the front-side portion of the lower shaft 10 by the end portion on the front side of the lower column 36 via a different rolling bearing. As a result, the steering shaft 2a is rotatably supported on the inner-diameter side of the steering column 12.

The vehicle-body-side bracket 13 supports an intermediate portion in the axial direction of the steering column 12 so as to be able to switch between an unclamped state in which it is possible to adjust the vertical position and the front-rear position of the steering wheel 1, and a clamped state in which the adjusted position of the steering wheel 1 is maintained. In this example, the vehicle-body-side bracket 13 has a mounting plate portion 38, a pair of support plate portions 39a, 39b, and a pair of vehicle-body-side through holes 40.

The mounting plate portion 38 has a pair of mounting holes 41 in portions on both sides in the width direction. The vehicle-body-side bracket 13 is supported by and fixed to the vehicle body so as not to fall off by bolts inserted through the pair of mounting holes 41.

The pair of support plate portions 39a, 39b are arranged so as to sandwich the pair of sandwiched portions 26a, 26b of the outer column 21 from both sides in the width direction. In this example, the end portions on the upper side of the pair of support plate portions 39a, 39b are joined and fixed by welding or the like to two positions of the lower surface of the mounting plate portion 38 that are separated in the width direction. In other words, the pair of support plate portions 39a, 39b hang downward from the two positions separated in the width direction of the lower surface of the mounting plate portion 38.

The pair of vehicle-body-side through holes 40 are formed in portions of the pair of support plate portions 39a, 39b that are aligned with each other. In this example, each of the vehicle-body-side through holes 40 is an elongated hole extending in the vertical direction. More specifically, each of the vehicle-body-side through holes 40 extends in an arc direction centered on the swing center in the vertical direction of the steering column 12.

Figure 2:
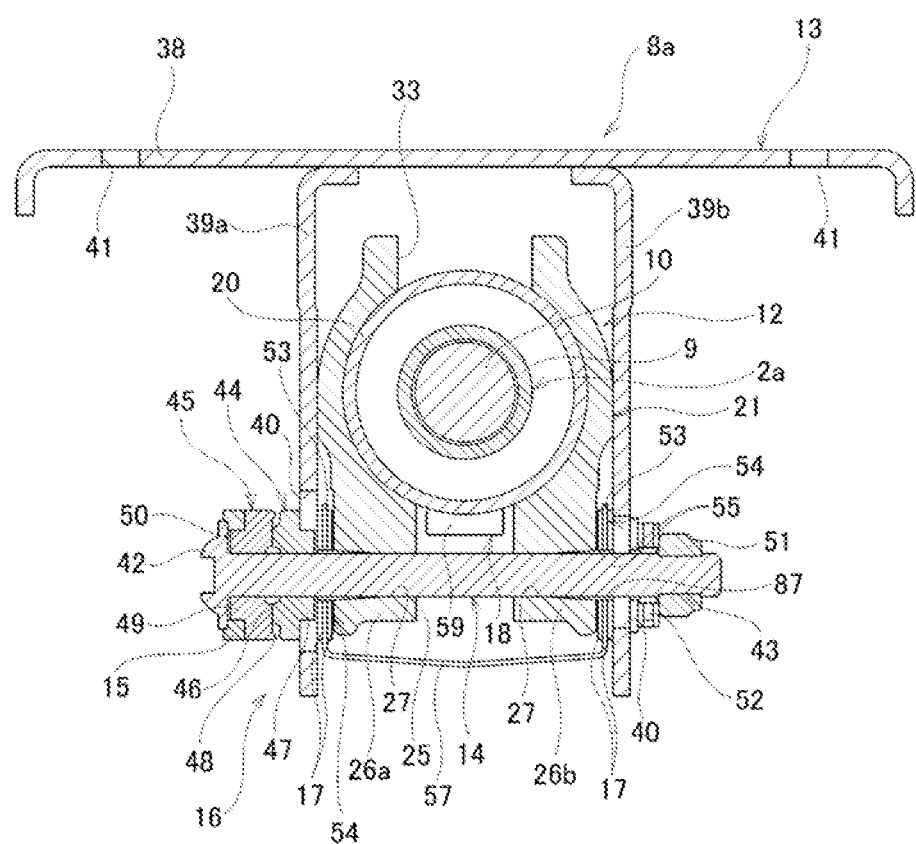
FIG. 2 is a cross-sectional view illustrating a portion of the steering column device illustrated in FIG. 1 in which there is a vehicle-body-side bracket.
Figure 3:
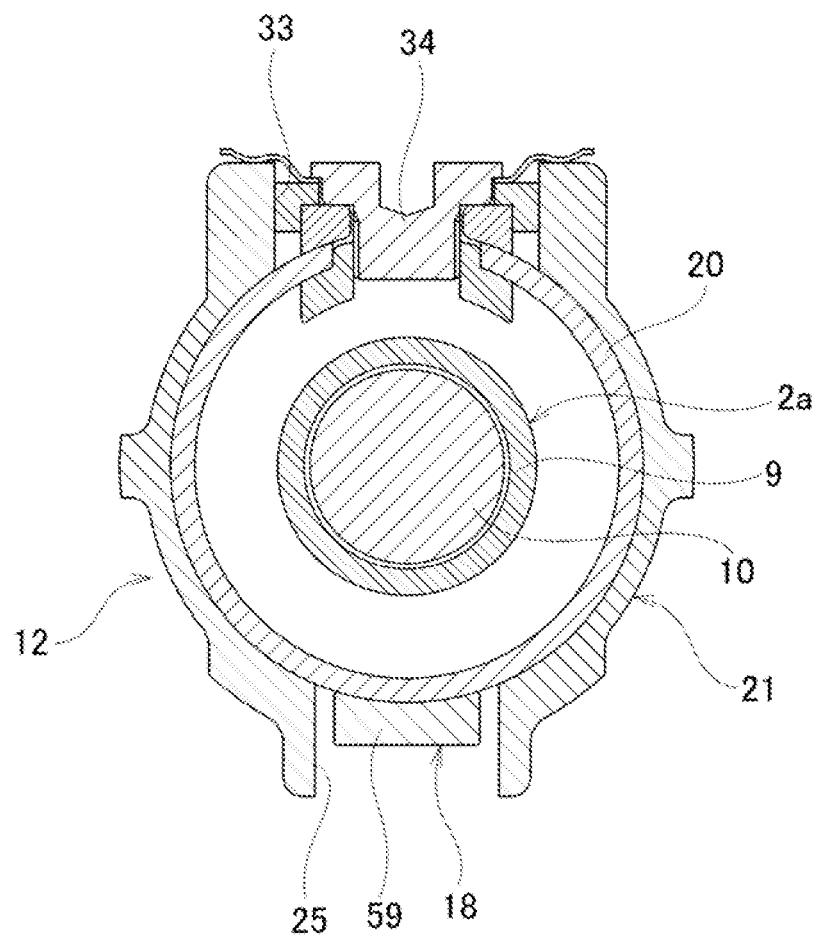
FIG. 3 is a cross-sectional view illustrating a portion of an inner column and an outer column of the steering column device illustrated in FIG. 1 in which a rotation prevention mechanism is incorporated.
Figure 4:
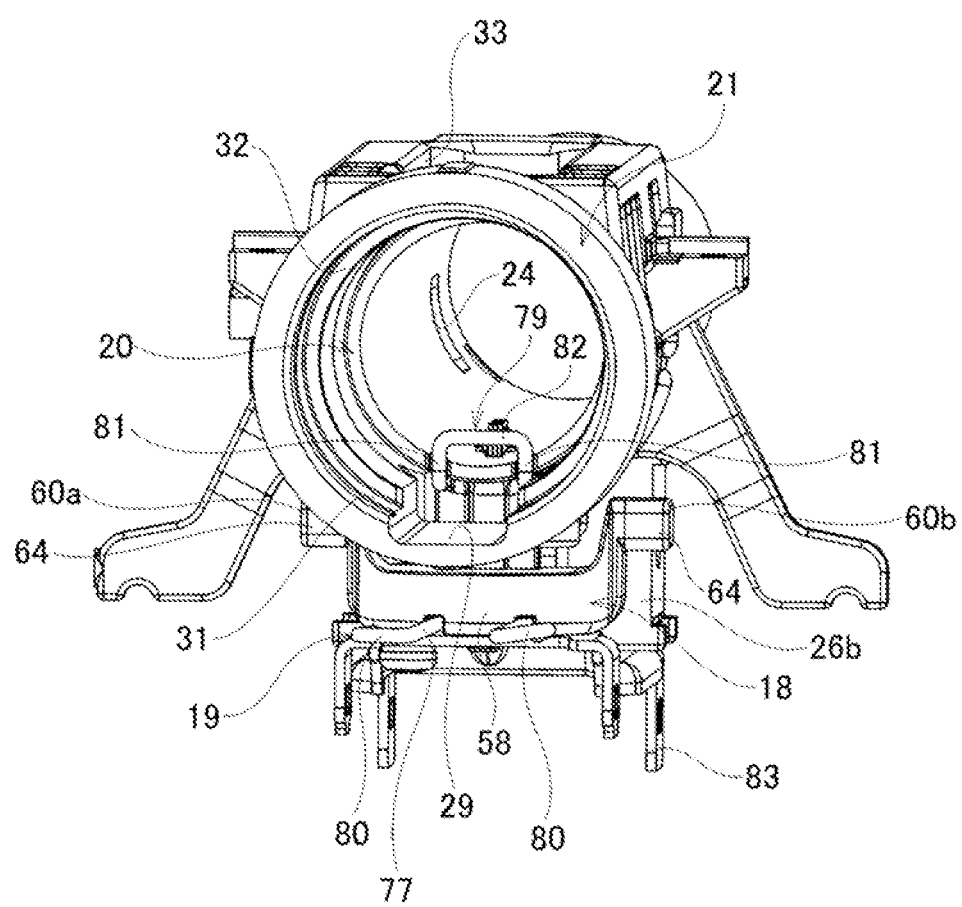
FIG. 4 is a perspective view of part of the members of the steering column device illustrated in FIG. 1 as viewed from the front side in a state before a secondary collision occurring.
Figure 5:
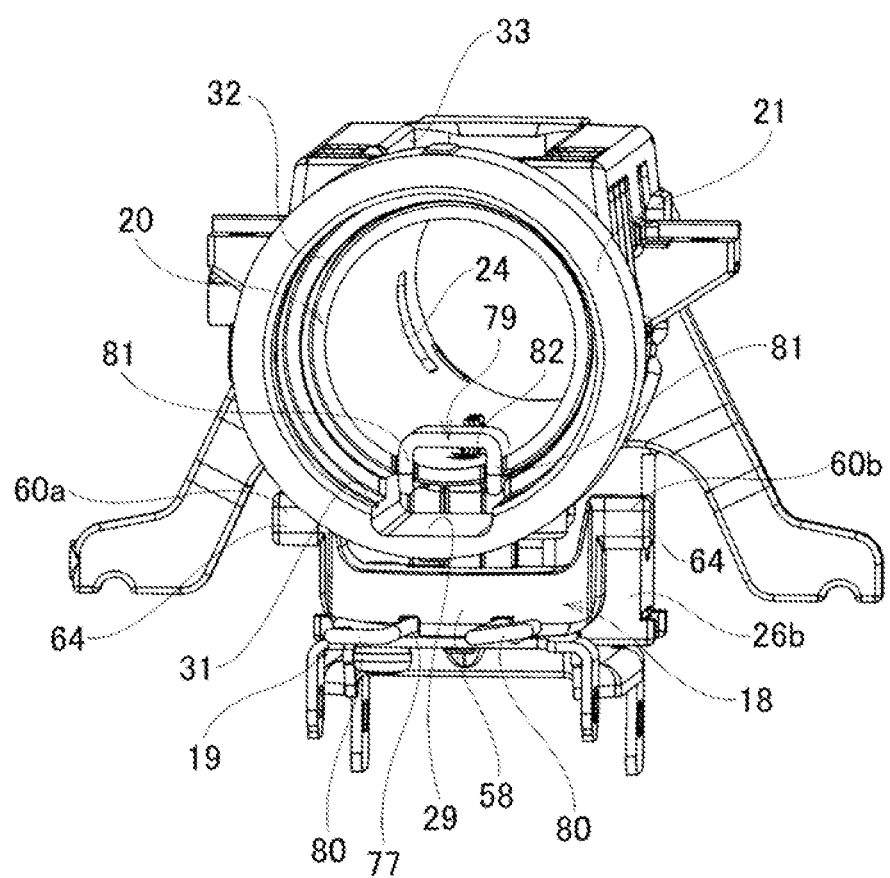
FIG. 5 is a perspective view of part of the members of the steering column device illustrated in FIG. 1 as viewed from the front side in a state after a secondary collision occurring.
Figure 6:
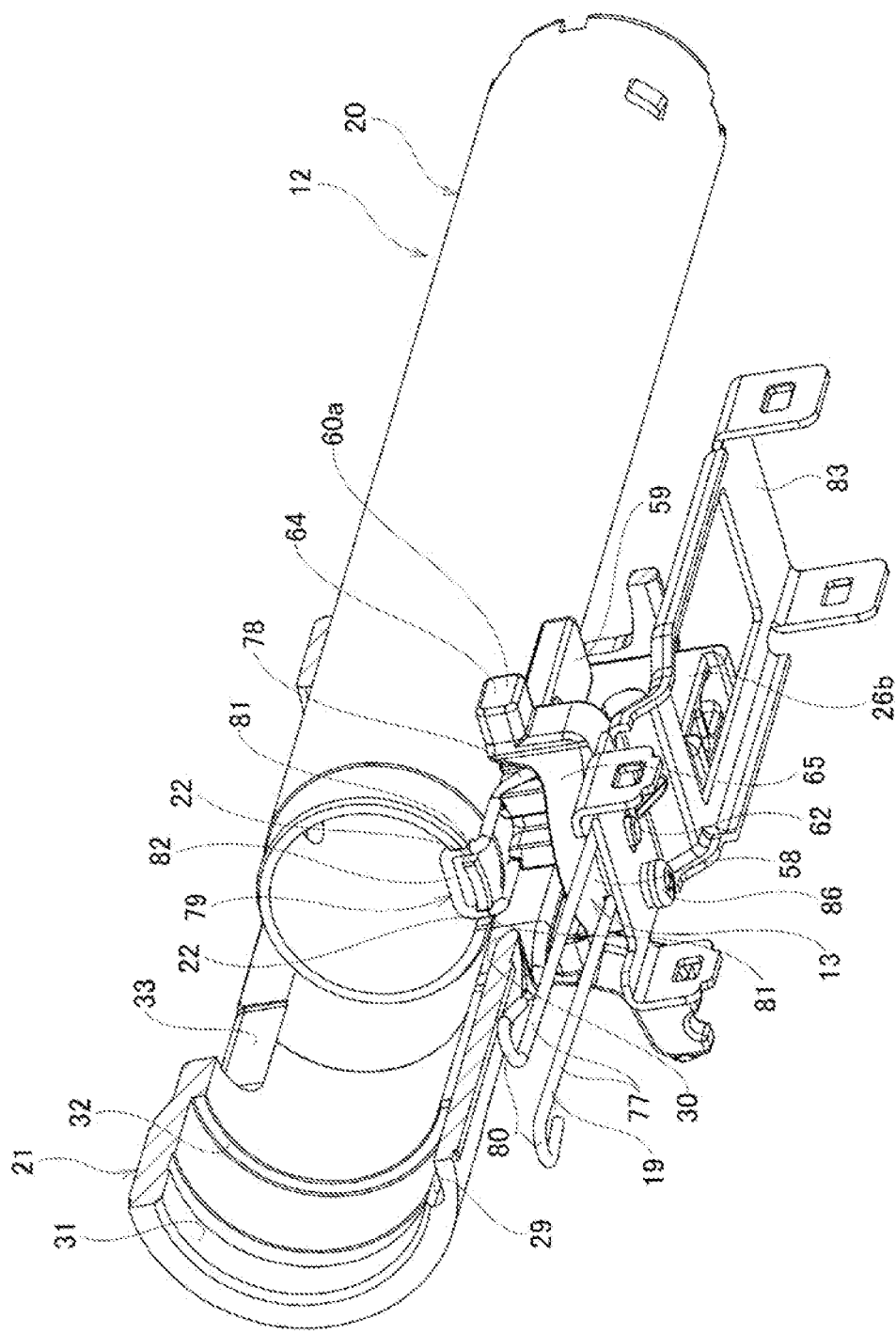
FIG. 6 is a perspective view of part of the members of the steering column device illustrated in FIG. 1 with a section taken from the outer column in the state before a secondary collision occurring.
Figure 7:
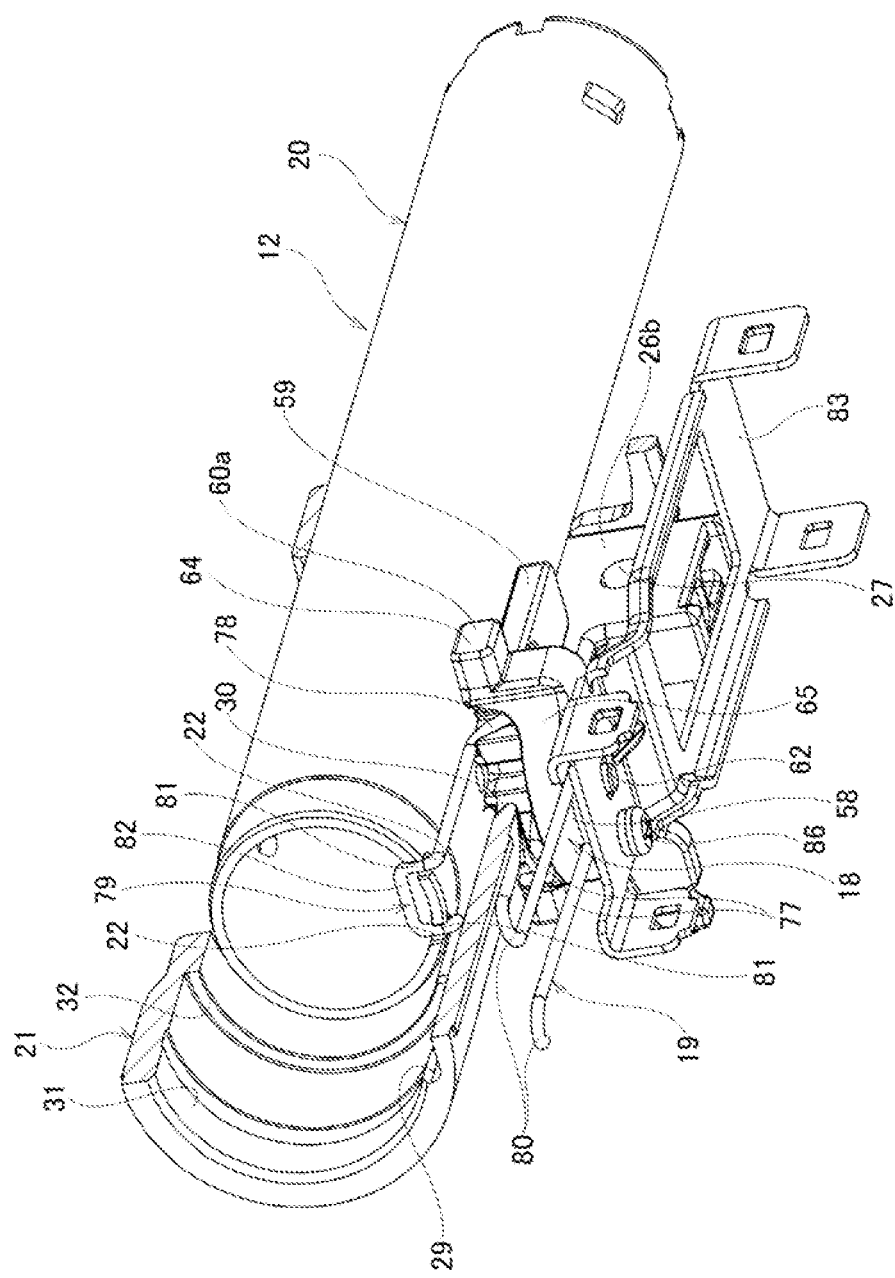
FIG. 7 is a perspective view of part of the members of the steering column device illustrated in FIG. 1 with a section taken from the outer column in the state after a secondary collision occurring.
Figure 8:
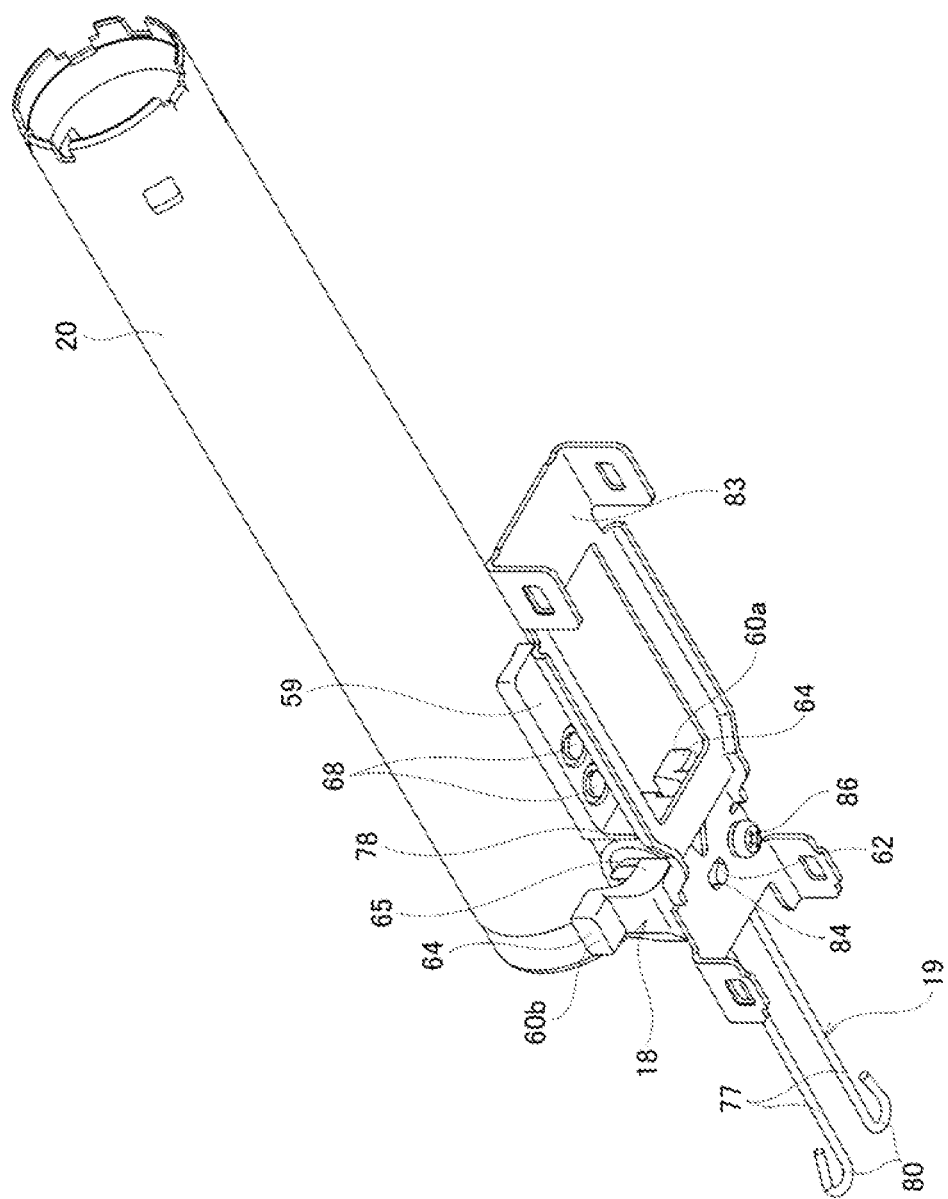
FIG. 8 is a perspective view of the inner column, the support bracket, the impact absorbing member, and the harness bracket of the steering device illustrated in FIG. 1.
Figure 9:
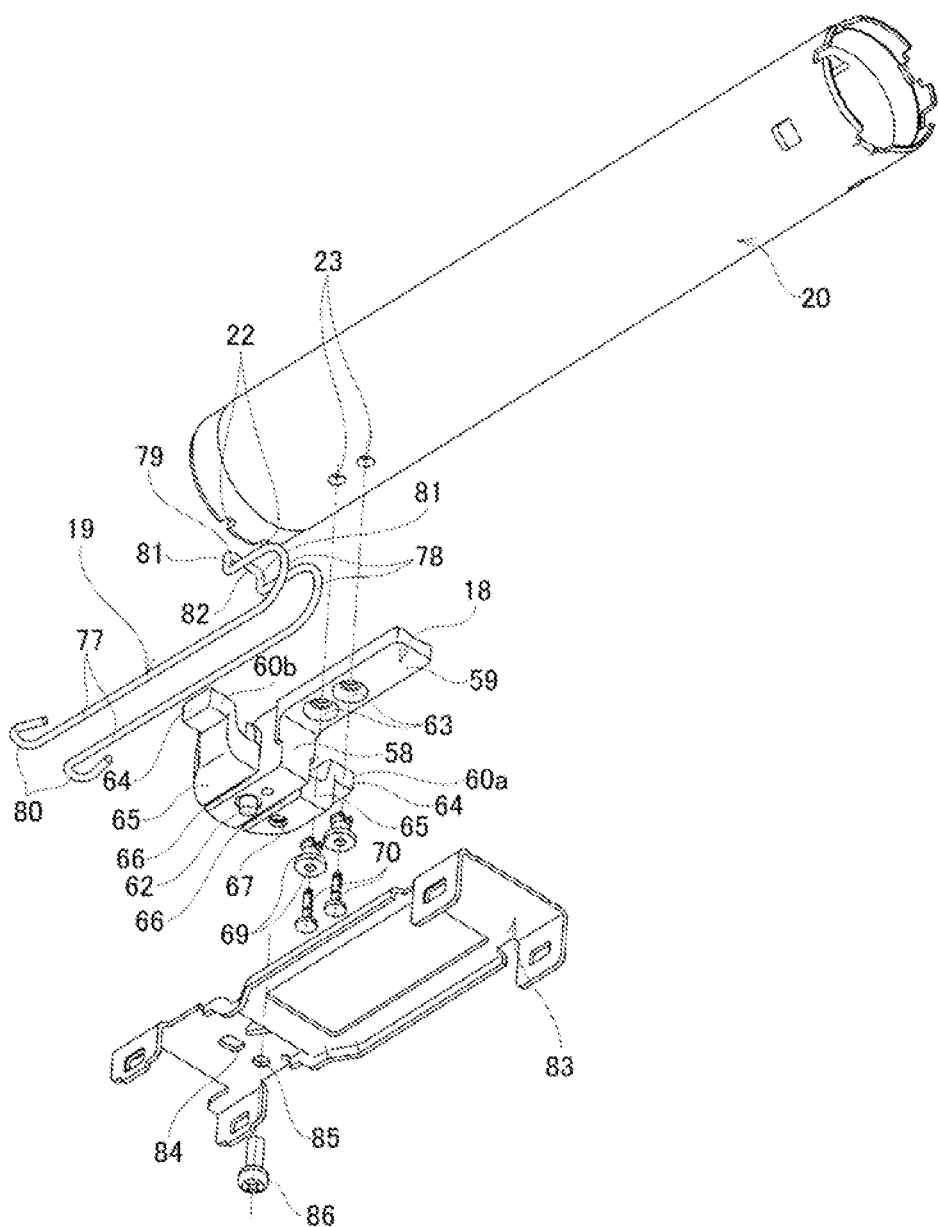
FIG. 9 is a perspective view of the inner column, the support bracket, the impact absorbing member, and the harness bracket of the steering device illustrated in FIG. 1.
Figure 10:
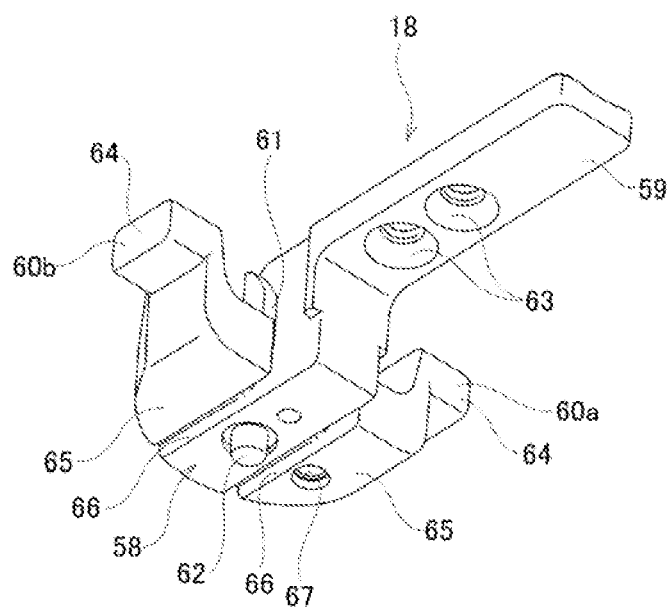
FIG. 10 is a perspective view of the support bracket of the steering device illustrated in FIG. 1.
Figure 11:
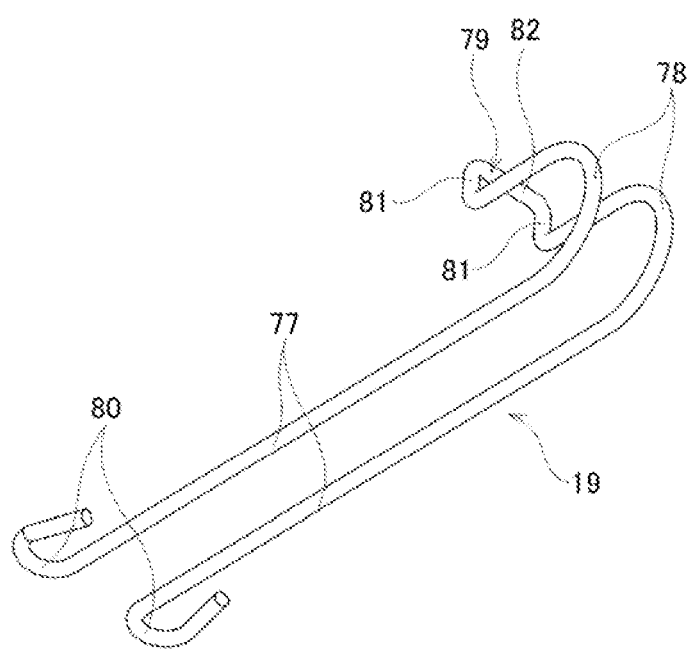
FIG. 11 is a perspective view of the impact absorbing member of the steering device illustrated in FIG. 1.
Figure 12:
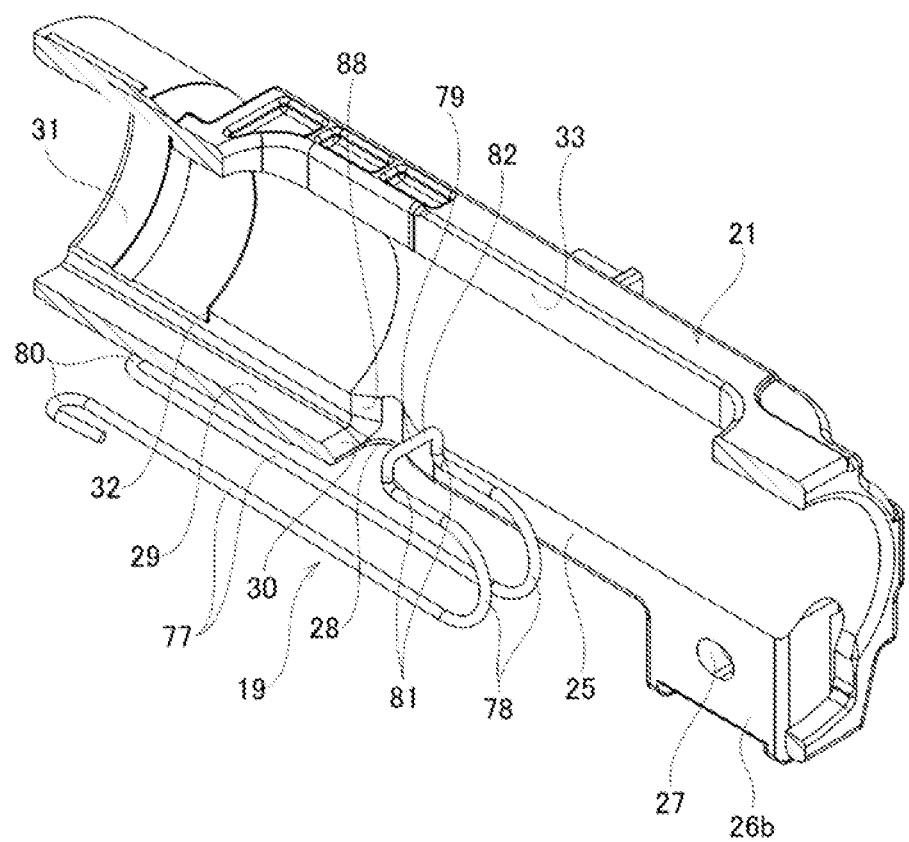
FIG. 12 is a perspective view of the outer column and the impact absorbing member of the steering device illustrated in FIG. 1 with a section taken from the outer column.
Figure 13:
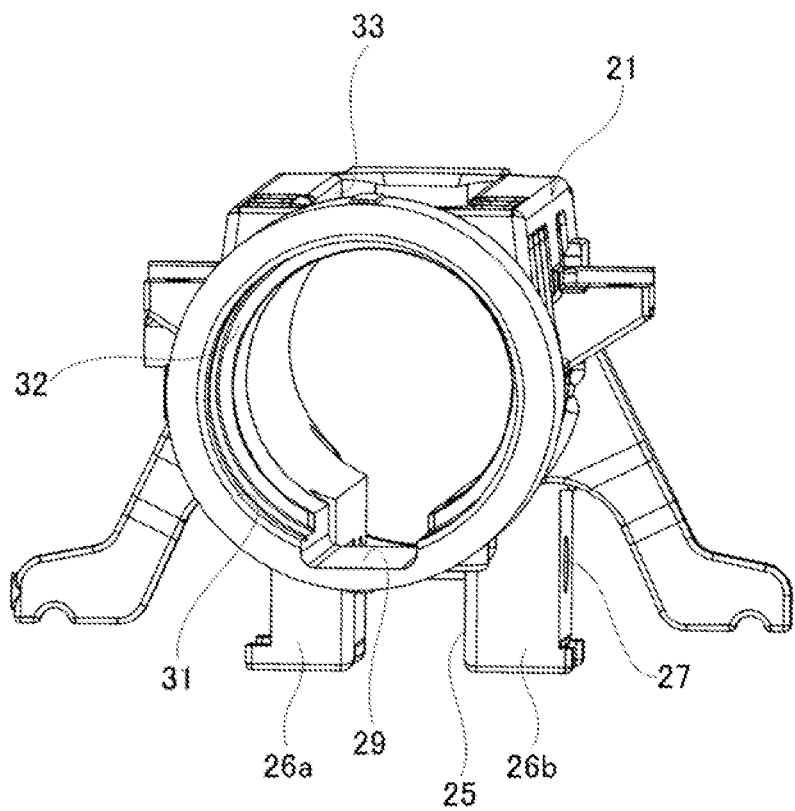
FIG. 13 is a perspective view of the outer column of the steering device illustrated in FIG. 1 viewed from the front side.

As illustrated in FIG. 2, the adjusting rod 14 is inserted in the width direction through the pair of column-side through holes 27 and the pair of vehicle-body-side through holes 40. The adjusting rod 14 has a head portion 42 on the end portion on one side (left side in FIG. 2) in the axial direction of the adjusting rod 14, and a male screw portion 43 on the end portion of the other side (right side in FIG. 2) in the axial direction of the adjusting rod 14. An adjusting lever 15 and a cam device 16 are arranged in that order from the outside in the width direction around a portion of the portion on the one side in the axial direction of the adjusting rod 14 that protrudes from the outside surface of one support plate portion 39a (left one in FIG. 2) of the pair of support plate portions 39a, 39b. In other words, the adjusting lever 15 and the cam device 16 are arranged between the head portion 42 and the outside surface of the support plate portion 39a.

The cam device 16 includes a driven-side cam 44 that is arranged on the inside in the width direction and a drive-side cam 45 arranged on the outside in the width direction.

The driven-side cam 44 is made of sintered metal, has a driven-side-cam surface 46, which is an uneven surface in the circumferential direction, on the outside surface in the width direction of the vehicle body, and a substantially rectangular engaging convex portion 47 that protrudes toward the inside in the width direction on the inside surface. The driven-side cam 44 is externally fitted onto the adjusting rod 14 so as to allow relative rotation with respect to the adjusting rod 14 and relative displacement in the axial direction of the adjusting rod 14. The driven-side cam 44 causes the engaging convex portion 47 to engage with the vehicle-body-side through hole 40 formed in one of the support plate portion 39a so that only displacement along the vehicle-body-side through holes 40 is possible.

The drive-side cam 45 is made of sintered metal and has a drive-side-cam surface 48, which is an uneven surface in the circumferential direction, on the inside surface in the width direction of the vehicle body. The drive-side cam 45 is fixed to the base portion of the adjusting lever 15, and rotates back-and-forth according to the back-and-forth swinging movement of the adjustment lever 15. More specifically, a fitting convex portion 49 formed on the outside surface of the drive-side cam 45 in the width direction of the vehicle body and a fitting hole 50 formed in the base portion of the adjusting lever 15 are fitted with a non-circular fit. The base portion of the adjusting lever 15 and the drive-side cam 45 may be externally fitted on the adjusting rod 14 so as to rotate integrally with the adjusting rod 14, or may be externally fitted on the adjusting rod 14 so as to be able to rotate relative to the adjusting rod 14.

On the other side in the axial direction of the adjusting rod 14, a nut 51 and a thrust bearing 52 are arranged in that order from the outside in the width direction around a portion that protrudes from the outside surface of the other support plate portion (right one in FIG. 2) 39b of the pair of support plate portions 39a, 39b. The nut 51 is screwed into the male screw portion 43 of the adjusting rod 14.

In the steering column device 8a of this example, by expanding or contracting the distance between the driven-side cam 44 of the cam device 16 and the thrust bearing 52 by swinging the adjusting lever 15 to expand or contract the dimension in the axial direction of the cam device 16, or in other words, the dimension in the width direction of the vehicle body, the distance between the pair of support plate portions 39a, 39b can be expanded or contracted. In other words, in this example, the driven-side cam 44 and the thrust bearing 52 of the cam device 16 correspond to a pair of pressing portions, and an expansion/contraction device is configured by the adjusting lever 15 and the cam device 16.

The telescopic friction plate 17 is arranged to increase the holding force for holding the steering column 12 with respect to the vehicle-body-side bracket 13. In this example, by arranging a friction plate unit 54 formed by sandwiching one fixed-side friction plate 53 between a pair of telescopic friction plates 17 respectively in the portions between the outside surfaces in the width direction of the pair of sandwiched portions 26a, 26b and the inside surfaces in the width direction of the pair of support plate portions 39a, 39b, the holding force for holding the steering column 12 is increased.

Each telescopic friction plate 17 is made of metal plate such as steel plate or the like having a large friction coefficient with respect to the inside surfaces in the width direction of the support plate portions 39a, 39b and the outside surfaces in the width direction of the sandwiched portions 26a, 26b, and is substantially rectangular when viewed from the width direction. The telescopic friction plate 17 has a telescopic elongated hole 55 extending in the axial direction of the steering column 12 in a range from the intermediate portion to the rear-side portion, and has a substantially rectangular support hole 56 in the front-side portion. The adjusting rod 14 is inserted through the telescopic elongated hole 55 of each of the telescopic friction plates, and the front-side portion of each of the telescopic friction plates is supported by the inner column 20 via the support bracket 18.

Each fixed-side friction plate 53 is made of metal plate such as a steel plate or the like having a large friction coefficient with respect to the side surfaces of the telescopic friction plates 17, and have a circular hole 87 to which the adjusting rod 14 is inserted. The central portions of the end portions on the lower side of the fixed-side friction plates 53 are connected to each other by a connecting plate portion 57. The connecting plate portion 57 is arranged below the pair of sandwiched portions 26a, 26b. The fixed-side friction plates 53 displace in synchronization with the adjusting rod 14 when adjusting the vertical position and the front-rear position of the steering wheel 1. In other words, the fixed-side friction plates 53 displace in the vertical direction together with the adjusting rod 14 when adjusting the vertical position of the steering wheel 1, and stay at the same position when adjusting the front-rear position of the steering wheel 1.

The support bracket 18 is supported on the lower surface of the inner column 20 so as to be able to detach due to an impact load that is applied to the inner column 20 at the time of a secondary collision. Moreover, the support bracket 18 supports the telescopic friction plates 17 so as to be able to displace in the width direction. In this example, the support bracket 18 includes a bracket base portion 58, a mounting portion 59, a pair of support arm portions 60a, 60b, and a pair of jerking portions 61.

The bracket base portion 58 has a rectangular column shape and has a column-shaped boss portion 62 in the center portion of the lower surface.

The mounting portion 59 has a rectangular plate shape and extends towards the rear from the end portion on the upper side of the end surface on the rear side of the bracket base portion 58. The mounting portion 59 has through holes 63 at two positions separated in the axial direction.

The support arm portions 60a, 60b extend in the width direction from both side surfaces in the width direction of the bracket base portion 58, and each of the support arm portions 60a, 60b has a crank-shaped side surface shape when viewed from the front-rear direction, and has a support convex portion 64 arranged on the outside in the width direction and a base-end portion 65 arranged on the inside in the width direction, the support convex portion 64 being offset toward the upper side with respect to the base-end portions 65.

The support convex portion 64 has a rectangular column shape. In this example, by inserting each of the support convex portions 64 into the support holes 56 of the telescopic friction plates 17 of the friction plate units 54 without looseness in the front-rear direction and so as to be able to displace in the width direction, each of the telescopic friction plates 17 is supported with respect to the support bracket 18 so as to be able to displace in the width direction. Each of the base end portions 65 has a concave groove 66 formed so as to be continuous with the lower surface of the end portion on the inside in the width direction and the rear-side surface, and has a jerking portion 61 on a portion of the bottom surface of the concave groove 66 facing the rear side (portion formed on the rear-side surface of the base-end portion 65). In this example, each of the jerking portions 61 is composed of a partial cylindrical surface. However, the jerking portions 61 may be a composite surface formed by combining a plurality of curved surfaces and/or flat surfaces.

Moreover, in this example, one support arm portion 60a of the support arm portions 60a, 60b has a screw hole 67 on the lower surface of the base-end portion 65.

In this example, the support bracket 18 is supported on the lower surface of the inner column 20 by the coupling member 68 so as to be able to detach due to an impact load applied to the inner column 20 at the time of a secondary collision. Each of the coupling members 68 includes an outer pin 69 and an inner pin 70, both of which are made of synthetic resin.

Figure 17:
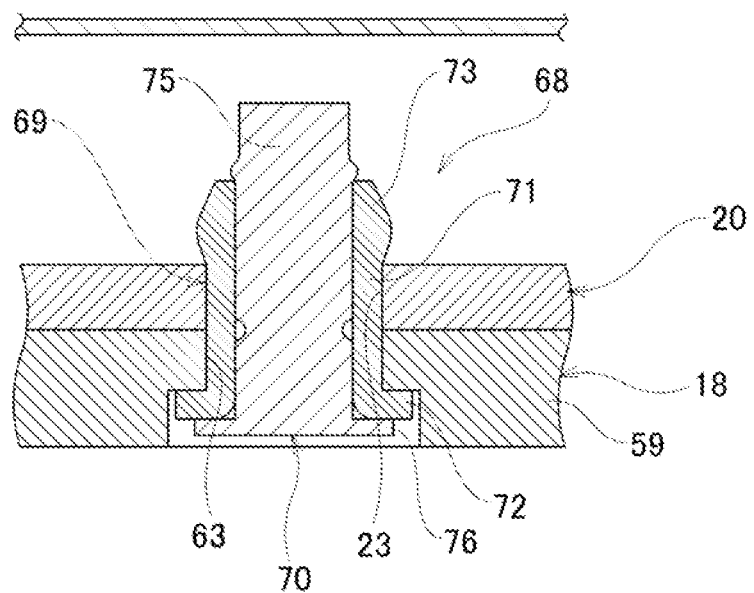
FIG. 17A is a cross-sectional view of one of the coupling members of the steering device illustrated in FIG. 1 that connects the inner column and the support bracket in a state before a secondary collision occurring.
FIG. 17B is a cross-sectional view of the coupling member in a state after a secondary collision occurring.
Figure 17:
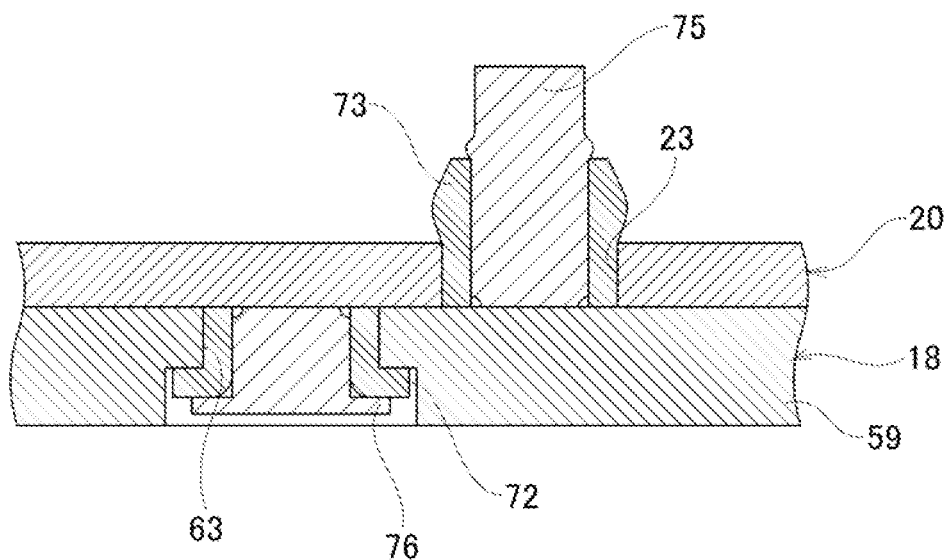
Figure 18:
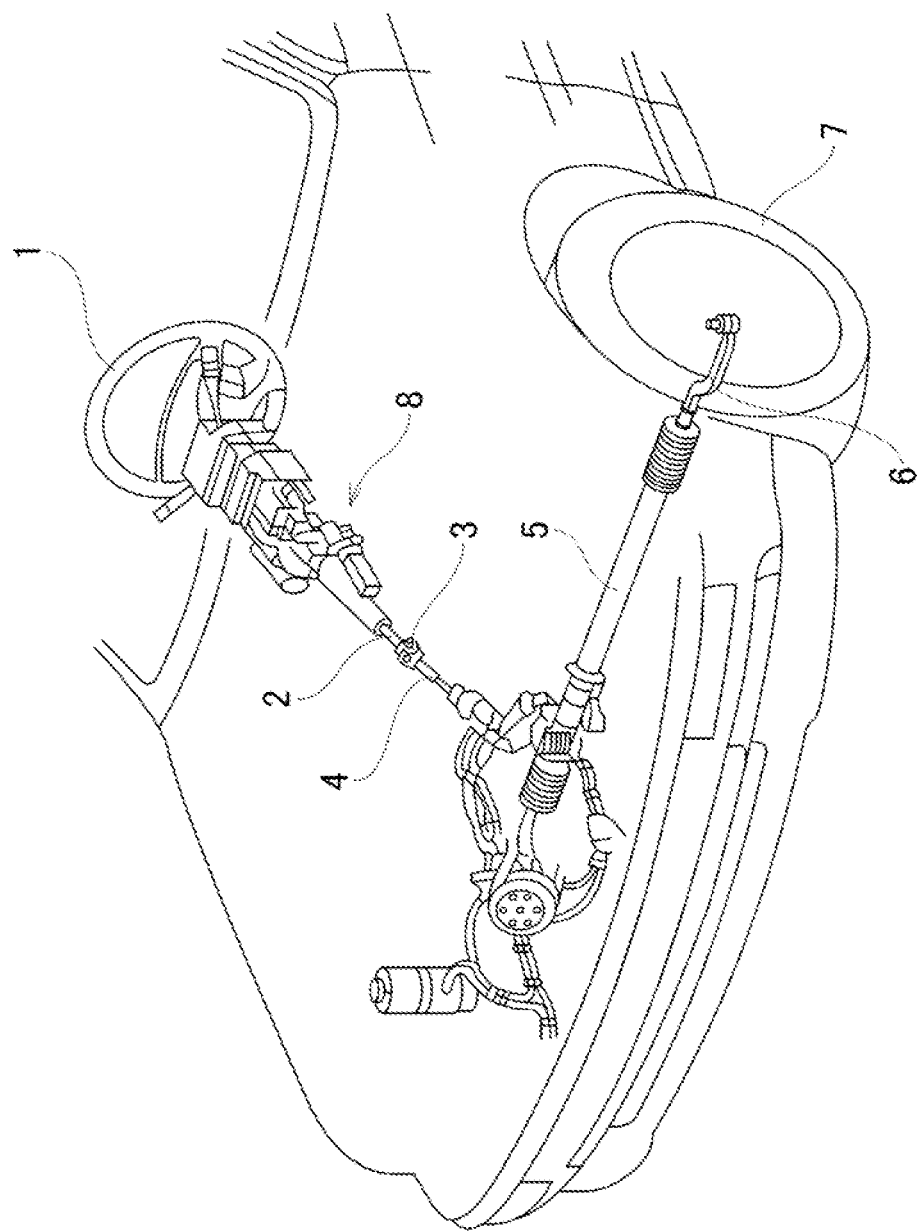
FIG. 18 is a perspective view illustrating an example of a conventional structure of a steering device.

As illustrated in FIG. 17, the outer pin 69 is formed in a tubular shape as a whole, and includes a cylindrical portion 71, an outward-facing flange portion 72 protruding toward the outside in the radial direction from the outer-circumferential surface of the base-end portion (end portion on the loser side of FIG. 17A) of the cylindrical portion 71, and a slitted portion 73 arranged adjacent to the tip-end side (upper side of FIG. 17A) of the cylindrical portion 71. The slitted portion 73 has slits that open to the end surface on the tip-end side at two positions on opposite sides in the radial direction. Moreover, the shape of the generating line of the slitted portion 73 is a substantially triangular shape. In other words, the outer-diameter dimension of the slitted portion 73 is larger than the outer-diameter dimension of the cylindrical portion 71. On the other hand, the inner-diameter dimension of the slitted portion 73 is equal to the inner-diameter dimension of the cylindrical portion 71.

The inner pin 70 has a shaft portion 75 and a head portion 76 formed at the base-end portion of the shaft portion 75.

In order to support the support bracket 18 with respect to the lower surface of the inner column 20, first, the front-side portion of the inner column 20 and the rear-side portion of the outer column 21 are fitted such that relative displacement is possible in the axial direction, and the rotation prevention member 34 is arranged inside the rotation prevention slit 33. In this state, the through holes 23 of the inner column 20 exist inside the slit 25 of the outer column 21. Next, the through holes 63 of the support bracket 18 are aligned with the through holes 23 of the inner column 20. In other words, the position in the axial direction of the support bracket 18 with respect to the inner column 20 is adjusted so that the through holes 63 and the through holes 23 are coaxial with each other. Next, the slitted portions 73 of the outer pins 69 are press-fitted into the through holes 63 of the support bracket 18 and the through holes 23 of the inner column 20 while elastically contracting from below, and then restored. As a result, the cylindrical portions 71 of the outer pins 69 are arranged inside the through holes 63 and the through holes 23, and the mounting portion 59 of the support bracket 18 and the inner column 20 are sandwiched and held between the outward flange portion 72 and the slitted portions 73. In other words, at the time of a secondary collision, the inner column 20 tends to displace toward the front with respect to the support bracket 18, and a shearing force is generated between the inner column 20 and the support bracket 18. As a result, the coupling member 68 is sheared, and the inner column 20 and the support bracket 18 are separated.

Next, the shaft portions 75 of the inner pins 70 are press-fitted into the inside in the radial direction of the outer pins 69 to prevent the split portions 73 of the outer pins 69 from shrinking. As a result, the support bracket 18 is supported on the lower surface of the inner column 20 so as to be able to detach due to an impact load to the inner column 20 in a direction toward the front at the time of a secondary collision.

However, by injecting synthetic resin into the through holes 63 and 23 (injection molding), or by using a synthetic resin or light alloy element pins that have been molded into a columnar shape in advance, and press fitting the pins into the through holes 63 and 23, it is also possible to support the support bracket 18 with respect to the lower surface of the inner column 20.

The impact absorbing member 19 is formed by bending and molding a metal wire such as mild steel or the like, and includes a pair of extending portions 77 extending in the axial direction, a pair of folded portions 78 that are bent in a U shape by about 180 degrees from the end portion on the rear side of the pair of extending portions 77 toward the upper side and the front side, and a base portion 79 that connects the end portions on the front side of a pair of folded portions 78.

In this example, each of the extending portions 77 includes a curved portion 80 that is bent more than 180 degrees in a substantially U shape from the end portion on the front side to the outside in the width direction and toward the rear side.

The base portion 79 includes a pair of bent portions 81 that is bent at right angles from the end portions of the front side of the pair of folded portions 78 toward the upper side, and a connecting portion 82 that connects the end portions on the upper sides of the pair of bent portions 81 to each other.

The impact absorbing member 19 spans between the inner column 20 and the support bracket 18, which are portions that displace relative to each other in the axial direction at the time of a secondary collision. More specifically, the impact absorbing member 19, together with causing the pair of bent portions 81 to engage with the notch portions 22 of the inner column 20, and causes the inner-circumferential surface (front-side surface) of the pair of folded portions 78 to face the jerking portions 61 of the support bracket 18. Moreover, the rear-side portions of the pair of extending portions 77 are arranged inside the portions of the concave grooves 66 of the support bracket 18 that face downward (the portions formed on the lower surfaces of the base-end portions 65).

Figure 14:
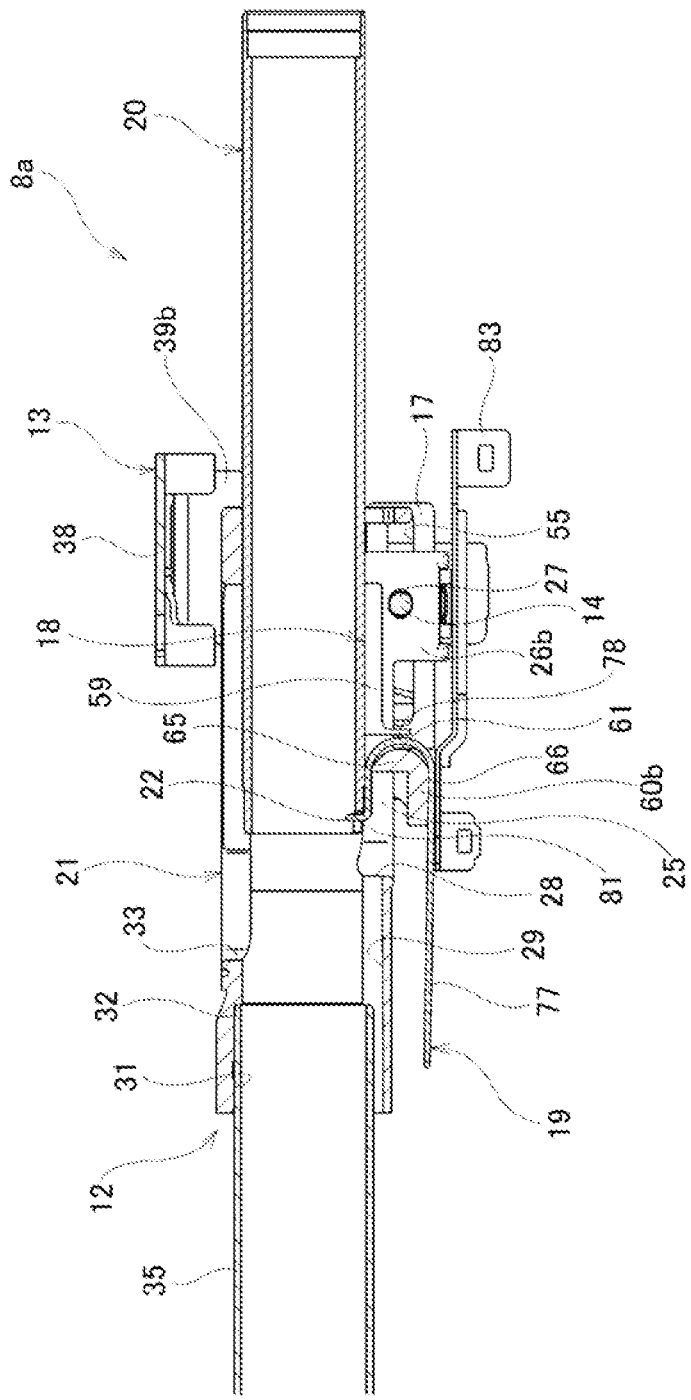
FIG. 14 is a perspective view of the steering column device illustrated in FIG. 1 with part of the members removed, and is a view of the state before a secondary collision occurs.

In this example, as illustrated in FIG. 14, in a state in which the impact absorbing member 19 spans between the inner column 20 and the support bracket 18 (state before the occurrence of a secondary collision), gaps exist in the portions between the pair of bent portions 81 and the inner end portion of the notch portions 22, and in the portions between the pair of folded portions 78 and the jerking portions 61. However, in the axial direction of the inner column 20, the length dimension of the gaps in the portions between the pair of bent portions 81 and the inner end portion of the notch portions 22 is smaller than the length dimension of the gaps in the portions between the pair of folded portions 78 and the jerking portions 61. More specifically, in the axial direction of the inner column 20, the sum of the length dimension of the gaps in the portions between the pair of bent portions 81 and the inner end portion of the notch portions 22 and the length dimension of the gaps in the portions between the pair of folded portions 78 and the jerking portions 61 may be set to be no less than 3 mm and no more than 15 mm, and preferably no less than 6 mm and no more than 10 mm.

The steering column device 8a of this example further includes a harness bracket 83 for supporting a wire harness. The harness bracket 83 is formed by punching and bending a metal plate such as a steel plate or the like by a press. The harness bracket 83 has an oval receiving hole 84 extending in the width direction arranged in the central portion in the width direction of the front-side portion, and has a circular hole 85 in a portion on one side in the width direction of the front-side portion.

The harness bracket 83 is supported by and fixed to the support bracket 18 by engagement of the receiving hole 84 and the boss portion 62 of the support bracket 18 (the boss portion 62 is inserted through the receiving hole 84), and screwing and further tightening a screw 86 that is inserted through the circular hole 85 into the screw hole 67 of the support bracket 18. As a result, when the impact absorbing member 19 is plastically deformed due to a secondary collision, the upper surface of the harness bracket 83 supports the rear-side portions of the pair of extending portions 77 that are arranged inside the concave grooves 66 of the support bracket 18 from the lower side, and prevents the extending portions 77 from deforming so as to swing downward. In other words, in this example, the harness bracket 83 has a function as a restraining portion.

A method for adjusting the position of the steering wheel 1 and then maintaining the adjusted steering wheel 1 in a vehicle equipped with the steering column device 8a of this example will be described. First, when performing position adjustment of the steering wheel 1, by swinging the adjusting lever 15 in a specified direction (for example, downward), the drive-side cam 45 is rotated in the unlocking direction. In doing so, by arranging the convex portion of the drive-side cam surface 48 and the convex portion of the driven-side cam surface 46 alternately in the circumferential direction, the dimension in the axial direction of the cam device 16 is reduced and the distance between the driven-side cam 44 and the thrust bearing 52 increases. As a result, the contact pressure between the inside surfaces of the support plate portions 39a, 39b and the outside surface of the sandwiched portions 26a, 26b is reduced or lost, and at the same time, the inner-diameter dimension of the rear-side portion of the outer column 21 is elastically expanded, and the contact pressure between the inner-circumferential surface of the rear-side portion of the outer column 21 and the outer-circumferential surface of the front-side portion of the inner column 20 is reduced. In such an unclamped state, it becomes possible to adjust the vertical position of the steering wheel 1 within the range in which the adjusting rod 14 is able to move inside the vehicle-body-side through holes 40 of the vehicle-body-side bracket 13, and it becomes possible to adjust the front-rear position of the steering wheel 1 within a range in which the adjusting rod 14 is able to move inside the telescopic elongated holes 55 of the telescopic friction plates 17.

By swinging the adjusting lever 15 in a direction opposite the specified direction (for example, upward) after the steering wheel 1 has been moved to a desired position, the drive-side cam 45 is rotated in the locking direction. Accordingly, by bringing the tip-end surface of the convex portion of the drive-side cam surface 48 and the tip-end surface of the convex portion of the driven-side cam surface 46 in contact with each other, the dimension in the axial direction of the cam device 16 is increased and the distance between the driven-side cam 44 and the thrust bearing 52 is reduced. As a result, the surface pressure at the contact portions between the inside surfaces of the support plate portions 39a, 39b and the outside surfaces of the sandwiched portions 26a, 26b increases, while at the same time, the inner-diameter dimension of the rear-side portion of the outer column 21 is elastically reduced, and the surface pressure at the contact portion between the inner-circumferential surface of the rear-side portion of the outer column 21 and the outer-circumferential surface of the front-side portion of the inner column 20 is increased. As a result, the steering wheel 1 is maintained at the adjusted position.

The movement when a vehicle equipped with the steering column device 8a of this example has a collision accident will be described. When a vehicle has a collision accident, first, the steering gear unit 5 (see FIG. 18) is pushed toward the rear as the front-side portion of the vehicle body is crushed by the primary collision in which the vehicle body collides with another object. When the steering gear unit 5 is pushed toward the rear, an impact load directed toward the rear is applied to the lower shaft 10 of the steering shaft 2a via the intermediate shaft 4. When an impact load directed toward the rear is applied to the lower shaft 10, the lower shaft 10 displaces toward the rear with respect to the upper shaft 9 such that the total length of the steering shaft 2a is reduced, and the lower column 36 that rotatably supports the front-side portion of the lower shaft 10 via a rolling bearing displaces toward the rear with respect to the intermediate column 35 such that the overall length of the steering column 12 is reduced. As a result, in the steering column device 8a of this example, during a primary collision, the steering wheel 1 is prevented from displacing so as to be pushed upward.

Following the primary collision, there is a possibility that a secondary collision may occur in which the driver's body collides with the steering wheel 1. When a secondary collision occurs, an impact load directed toward the front is applied from the steering wheel 1 to the inner column 20 via the upper shaft 9. When an impact load directed toward the front is applied to the inner column 20, the inner column 20 tries to displace toward the front with respect to the vehicle-body-side bracket 13 and the support bracket 18 supported by the telescopic friction plates 17. As a result, a shearing force is generated between the inner column 20 and the support bracket 18, and the coupling member 68 is sheared by the shearing force. As a result, the inner column 20 and the upper shaft 9 and the steering wheel 1 that are supported by the inner column 20 are allowed to displace toward the front, and the impact load that is applied to the driver's body is alleviated.

In this example, as the inner column 20 displaces toward the front, the impact absorbing member 19 that spans between the inner column 20 and the support bracket 18 is plastically deformed. In other words, when the inner column 20 displaces toward the front and the base portion 79 of the impact absorbing member 19 is pulled toward the front, the pair of folded portions 78 of the shock absorbing member 19 are pressed against the jerking portions 61 of the support bracket 18. When the inner column 20 further displaces toward the front from this state, the portions that were the folded portions 78 are jerked by the jerking portions 61 and displace toward the front (to a straight portion that connects the folded portions 78 and the base portion 79), and the portions that were the extending portions 77 are also moved to the portions to be jerked by the jerking portions 61 and are curved to become the folded portions 78. In this way, in this example, the inner column 20 displaces toward the front while plastically deforming the impact absorbing member 19, and therefore the impact load applied to the driver's body that collides with the steering wheel 1 may be further alleviated.

In this example, immediately after a secondary collision occurs, the coupling member 68 is sheared and the inner column 20 starts to displace toward the front, which plastically deforms the impact absorbing member 19 and makes it possible to start absorbing the impact load. In other words, regardless of the fact that the inner column 20 displaces toward the front, it is possible to substantially eliminate the idling section in which the impact absorbing member 19 is not able to be plastically deformed (except for the idling portions due to the spaces existing in the portions between the pair of bent portions 81 and the inner end portion of the notch portions 22, and the portions between the pair of folded portions 78 and the jerking portions 61).

As the inner column 20 displaces toward the front, the portion of the impact absorbing member 19 connecting the end portions on the lower side of the pair of bent portions 81 of the base portion 79 and the end portions on the upper side of the pair of folded portions 78 is guided to the inside of the concave portion 29 by the first guiding surface 30. As a result, the connecting portion is prevented from being bitten between the outer-circumferential surface of the inner column 20 and the inner-circumferential surface of the outer column 21, and therefore the inner column 20 may be smoothly displace toward the front. In this example, the concave portion 29 has a second guiding surface 88 at the end portion on the rear side, which is inclined in a direction in which the width dimension becomes wider going toward the rear side. Therefore, even in a case where it is presumed that the portion of the impact absorbing member 19 that connects the end portions of the lower side of the pair of bent portions 81 of the base portion 79 and the end portions of the upper side of the pair of folded portions 78 is deformed to spread in the width direction when jerked by the jerking portions 61, the connecting portion is guided inside the concave portion 29 by the second guiding surface 88.

The steering column device 8a of this example is configured such that the inner column 20 displaces toward the front due to the impact load at the time of a secondary collision, but does not fall off even when the secondary collision progresses. Therefore, it is possible to prevent the steering wheel 1 from displacing excessively downward even in a state where the secondary collision has progressed, and thus, for example, in a case where the vehicle involved in the accident is capable of self-driving, it becomes possible to more easily drive the accident vehicle from the accident site to the shoulder of the road.

The steering column device 8a of this example includes an impact absorbing member 19 that absorbs an impact load due to a secondary collision by plastically deforming due to the inner column 20 displacing toward the front during a secondary collision. Therefore, with the steering column device 8a of this example, the absorbed amount of the impact load applied to the steering wheel 1 at the time of a secondary collision may be made larger compared with the steering column device described in the pamphlet of WO 2016/114034.

In this example, the support bracket 18 is supported at the center position in the width direction of the lower surface of the inner column 20, and the impact absorbing member 19 is arranged so as to span between the support bracket 18 and the inner column 20. In other words, the impact absorbing member 19 may be arranged at the central position in the width direction of the inner column 20, and therefore the orientation of the impact absorbing member 19 at the time of a secondary collision may be stabilized, and the impact absorption performance due to plastic deformation of the impact absorbing member 19 is easily stabilized.

In this example, in a state in which the impact absorbing member 19 spans between the inner column 20 and the support bracket 18 (state before the occurrence of a secondary collision), gaps exist in the portions between the pair of bent portions 81 and the inner end portion of the notch portions 22, and in the portions between the pair of folded portions 78 and the jerking portions 61. Therefore, even after the support bracket 18 is connected to the inner column 20, the impact absorbing member 19 may be easily assembled between the inner column 20 and the support bracket 18. However, with respect to the axial direction of the inner column 20, the length dimension of the gap in the portions between the pair of bent portions 81 and the inner end portion of the notch portions 22 is smaller than the length dimension of the gap in the portions between the pair of folded portions 78 and the jerking portions 61. Therefore, it is possible to prevent the impact absorbing member 19 from falling off from the inner column 20 from a state in which the impact absorbing member 19 spans between the inner column 20 and the support bracket 18.

By providing gaps between the portions between the pair of bent portions 81 and the inner end portion of the notch portions 22, and the portions between the pair of folded portions 78 and the jerking portions 61, it is possible to suppress variations in impact absorption characteristics during a secondary collision.

Figure 15:
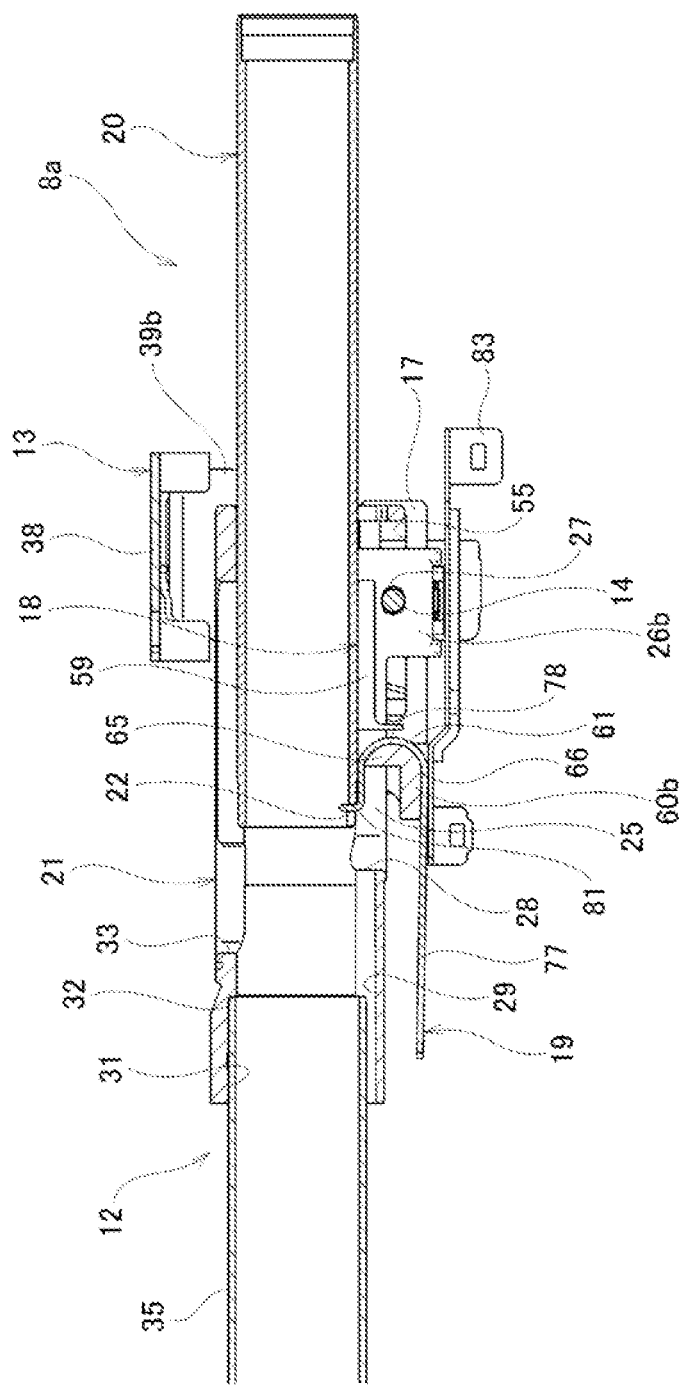
FIG. 15 is a perspective view of part of the members of the steering column device illustrated in FIG. 1 in a state just after a secondary collision occurring.
Figure 16:
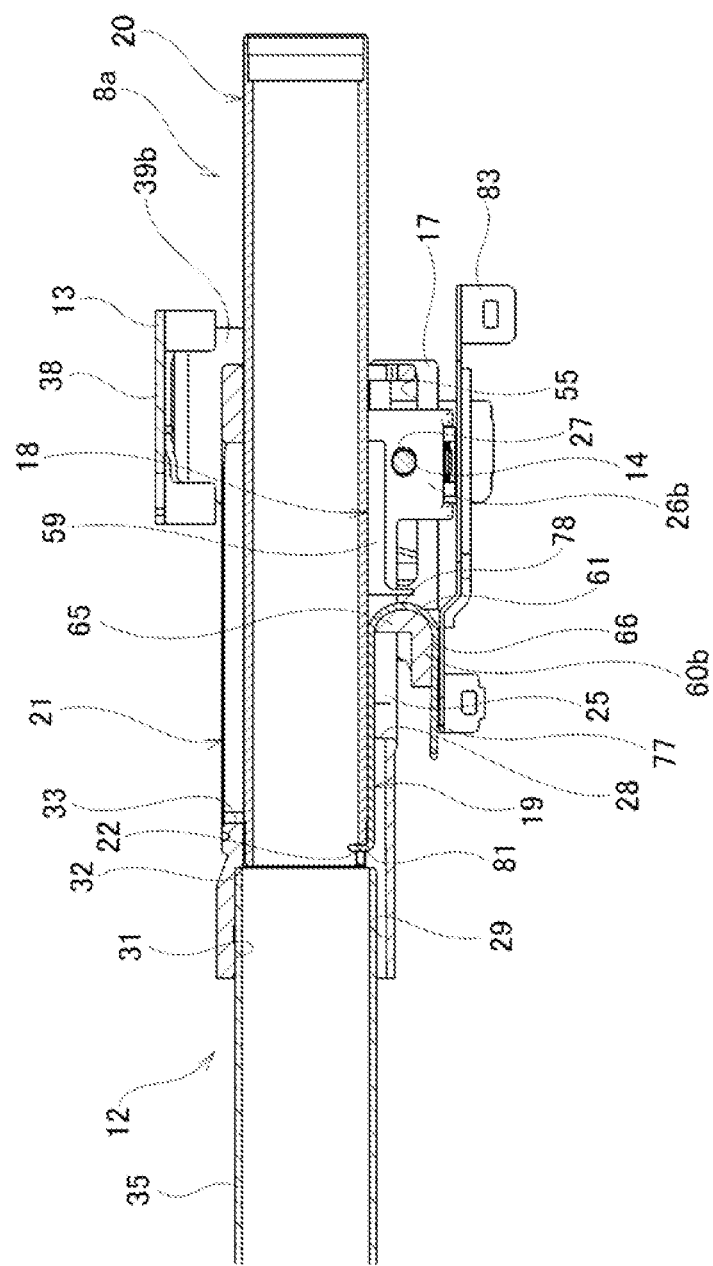
FIG. 16 is a cross-sectional view of part of the members of the steering column device illustrated in FIG. 1 in a state after a secondary collision progressing from the state illustrated in FIG. 15.

In other words, there are gaps in at least one of the portions between the pair of bent portions 81 and the inner end portion of the notch portions 22 and the portions between the pair of folded portions 78 and jerking portions 61, and thus at the instant where a secondary collision occurs, the pair of folded portions 78 of the impact absorbing member 19 are not jerked. Therefore, at the moment when a secondary collision occurs, most of the forward impact load applied to the inner column 20 may be used as a force for shearing the coupling member 68. As illustrated in FIG. 15, when the coupling member 68 is sheared and the inner column 20 displaces toward the front, the pair of folded portions 78 is pressed against the jerking portions 61 (the gaps between the pair of folded portions 78 and the jerking portions 61 becomes 0). From this state, as illustrated in FIG. 16, by the inner column 20 further displacing toward the front, the portions that were the folded portions 78 are jerked by the jerking portions 61 and displace toward the front. In short, according to this example, after the coupling member 68 is sheared for sure, plastic deformation of the impact absorbing member 19 may be started. As a result, it is possible to suppress variation in impact absorption characteristics due to plastic deformation of the impact absorbing member 19.

In this example, the outer column 21 is such that the end portion on the front side of the concave portion 29 formed in a portion of the inner-circumferential surface existing on the front side of the slit 25 is made to open to the end surface on the front side of the outer column 21. Therefore, even in a case where the outer column 21 is made by casting, the mold may be removed without difficulty. Moreover, the rigidity in the radial direction of the fitting support portion 31 formed on the inner-circumferential surface of the end portion on the front side of the outer column 21 may be appropriately reduced, and thus the press-fitting load when press-fitting the end portion on the rear side of the intermediate column 35 into the fitting support portion 31 may kept small and may be stabilized.

REFERENCE SIGNS LIST

1 Steering wheel
2, 2a Steering shaft
3 Universal joint
4 Intermediate shaft
5 Steering gear unit
6 Tie rod
7 Steered wheels
8, 8a Steering column device
9 Upper shaft
10 Lower shaft
11 Key lock collar
12 Steering column
13 Vehicle-body-side bracket
14 Adjusting rod
15 Adjusting lever
16 Cam device
17 Telescopic friction plate
18 Support bracket
19 Impact absorbing member
20 Inner column
21 Outer column
22 Notch portion
23 Through hole
24 Locking through hole
25 Slit
26a, 26b Sandwiched portion
27 Column-side through hole
28 Wide portion
29 Concave portion
30 First guiding surface
31 Fitting support portion
32 Stepped portion
33 Rotation prevention slit
34 Rotation prevention member
35 Intermediate column
36 Lower column
37 Bushing
38 Mounting plate portion
39a, 39b Support plate portion
40 Vehicle-body-side through holes
41 Mounting hole
42 Head portion
43 Male screw portion
44 Driven-side cam
45 Drive-side cam
46 Driven-side cam surface
47 Engaging convex portion
48 Drive-side cam surface
49 Fitting convex portion
50 Fitting hole
51 Nut
52 Thrust bearing
53 Fixed-side friction plate
54 Friction plate unit
55 Telescopic elongated hole
56 Support hole
57 Connecting plate portion
58 Bracket base portion
59 Mounting portion
60a, 60b Support arm portion
61 Jerking portion
62 Boss portion
63 Through hole
64 Support convex portion
65 Base-end portion
66 Concave groove
67 Screw hole
68 Coupling member
69 Outer pin
70 Inner pin
71 Cylindrical portion
72 Outward-facing flange portion 73 Slitted portion
75 Shaft portion
76 Head portion
77 Extending portion
78 Folded portion
79 Base portion
80 Curved portion
81 Bent portion
82 Connecting portion
83 Harness bracket
84 Receiving hole
85 Circular hole
86 Screw
87 Circular hole
88 Second guiding surface

The invention claimed is:

1. A steering column device comprising:
an inner column;
an outer column having a rear-side portion into which a front-side portion of the inner column is internally fitted, a slit extending in an axial direction, a pair of sandwiched portions arranged at positions sandwiching the slit from both sides in a width direction, and a pair of column-side through holes penetrating each of the pair of sandwiched portions in the width direction;
a vehicle-body-side bracket having a pair of support plate portions sandwiching the pair of sandwiched portions, and a pair of vehicle-body-side through holes provided in portions of the pair of support plate portions that are aligned with each other;
an adjusting rod inserted through the pair of column-side through holes and the pair of vehicle-body-side through holes;
a pair of pressing portions arranged on portions of the adjusting rod that protrude from outside surfaces of the pair of support plate portions;
an expansion/contraction mechanism expanding or contracting a distance between the pair of pressing portions;
a telescopic friction plate sandwiched in at least any of a portion between an inside surface of the pair of support plate portions and an outside surface of the pair of sandwiched portions, and a portion between an outside surface of the pair of support plate portions and an inside surface of the pair of pressing portions, and having a telescopic elongated hole through which the adjusting rod is inserted;
a support bracket having a mounting portion arranged inside the slit and joined to the inner column so as to be able to detach due to an impact load that is applied to the inner column during a secondary collision, and a support arm portion supporting the telescopic friction plate, and a jerking portion provided on a surface facing a rear side; and
an impact absorbing member made of a wire material and having a base portion, a folded portion folded back to an outside in a radial direction of the inner column and to a front side from an end portion of the rear side of the base portion, and an extending portion extending to the front side from an end portion of the folded portion on the outside in the radial direction of the inner column;
wherein
the base portion is attached to the inner column so as to displace together with the inner column when the inner column displaces forward, and the folded portion faces the jerking portion in the front-rear direction, and the outer column has a concave portion in a portion of an inner-circumferential surface existing on the front side of the slit, the concave portion open to an end portion on the front side of the slit and recessed toward an outside in a radial direction of the outer column.

2. The steering column device according to claim 1, comprising
a restraining portion for preventing the extending portion from being deformed outward in the radial direction of the inner column during a secondary collision.

3. The steering column device according to claim 2, wherein
the restraining portion is composed of a harness bracket that is supported by and fixed to the support bracket.

4. The steering column device according to claim 1, wherein
the concave portion has a first guiding surface on an end portion on the rear side that is inclined in a direction in which a depth dimension becomes deeper going toward the rear side.

5. The steering column device according to claim 1, wherein
the concave portion has a second guiding surface on an end portion on the rear side that is inclined in a direction in which a width dimension increases going toward the rear side.

6. The steering column device according to claim 1, wherein
the folded portion is composed of a pair of folded portions, and the extending portion is composed of a pair of extending portions, and end portions of the pair of folded portions on an inside in the radial direction of the inner column are connected by the base portion.

7. A steering column device according to claim 6, wherein
the inner column has notch portions at two positions in end portions on the front side that are separated in a circumferential direction thereof, the base portion of the impact absorbing member has bent portions that are bent at right angles from the end portions on the front side of the pair of folded portions, and a connecting portion that connects together end portions of the bent portions, and the bent portions engage with the notch portions.

8. A steering column device according to claim 1 comprising
an intermediate column in which an end portion on the rear side is fitted to an end portion on the front side of the outer column so that displacement rearward is not possible, and a lower column in which an end portion on the rear side is fitted to an end portion on the front side of the intermediate column so that displacement rearward is possible in a case where a rearward impact load is applied due to a primary collision.

9. A steering column device comprising:
an inner column;
an outer column having a rear-side portion into which a front-side portion of the inner column is internally fitted, a slit extending in an axial direction, a pair of sandwiched portions arranged at positions sandwiching the slit from both sides in a width direction, and a pair of column-side through holes penetrating each of the pair of sandwiched portions in the width direction;
a vehicle-body-side bracket having a pair of support plate portions sandwiching the pair of sandwiched portions, and a pair of vehicle-body-side through holes provided in portions of the pair of support plate portions that are aligned with each other;

an adjusting rod inserted through the pair of column-side through holes and the pair of vehicle-body-side through holes;
a pair of pressing portions arranged on portions of the adjusting rod that protrude from outside surfaces of the pair of support plate portions;
an expansion/contraction mechanism expanding or contracting a distance between the pair of pressing portions;
a telescopic friction plate sandwiched in at least any of a portion between an inside surface of the pair of support plate portions and an outside surface of the pair of sandwiched portions, and a portion between an outside surface of the pair of support plate portions and an inside surface of the pair of pressing portions, and having a telescopic elongated hole through which the adjusting rod is inserted;
a support bracket having a mounting portion arranged inside the slit and joined to the inner column so as to be able to detach due to an impact load that is applied to the inner column during a secondary collision, and a support arm portion supporting the telescopic friction plate, and a jerking portion provided on a surface facing a rear side;
an impact absorbing member made of a wire material and having a base portion, a folded portion folded back to an outside in a radial direction of the inner column and to a front side from an end portion of the rear side of the base portion, and an extending portion extending to the front side from an end portion of the folded portion on the outside in the radial direction of the inner column; and
a restraining portion for preventing the extending portion from being deformed outward in the radial direction of the inner column during a secondary collision,
wherein
the base portion is attached to the inner column so as to displace together with the inner column when the inner column displaces forward, and the folded portion faces the jerking portion in the front-rear direction, and
the restraining portion is composed of a harness bracket that is supported by and fixed to the support bracket.

10. The steering column device according to claim 9, wherein
the folded portion is composed of a pair of folded portions, and the extending portion is composed of a pair of extending portions, and end portions of the pair of folded portions on an inside in the radial direction of the inner column are connected by the base portion.

11. A steering column device according to claim 10, wherein
the inner column has notch portions at two positions in end portions on the front side that are separated in a circumferential direction thereof, the base portion of the impact absorbing member has bent portions that are bent at right angles from the end portions on the front side of the pair of folded portions, and a connecting portion that connects together end portions of the bent portions, and the bent portions engage with the notch portions.

12. A steering column device according to claim 9 comprising
an intermediate column in which an end portion on the rear side is fitted to an end portion on the front side of the outer column so that displacement rearward is not possible, and a lower column in which an end portion on the rear side is fitted to an end portion on the front side of the intermediate column so that displacement rearward is possible in a case where a rearward impact load is applied due to a primary collision.

13. A steering column device comprising:
an inner column;
an outer column having a rear-side portion into which a front-side portion of the inner column is internally fitted, a slit extending in an axial direction, a pair of sandwiched portions arranged at positions sandwiching the slit from both sides in a width direction, and a pair of column-side through holes penetrating each of the pair of sandwiched portions in the width direction;
a vehicle-body-side bracket having a pair of support plate portions sandwiching the pair of sandwiched portions, and a pair of vehicle-body-side through holes provided in portions of the pair of support plate portions that are aligned with each other;
an adjusting rod inserted through the pair of column-side through holes and the pair of vehicle-body-side through holes;
a pair of pressing portions arranged on portions of the adjusting rod that protrude from outside surfaces of the pair of support plate portions;
an expansion/contraction mechanism expanding or contracting a distance between the pair of pressing portions;
a telescopic friction plate sandwiched in at least any of a portion between an inside surface of the pair of support plate portions and an outside surface of the pair of sandwiched portions, and a portion between an outside surface of the pair of support plate portions and an inside surface of the pair of pressing portions, and having a telescopic elongated hole through which the adjusting rod is inserted;
a support bracket having a mounting portion arranged inside the slit and joined to the inner column so as to be able to detach due to an impact load that is applied to the inner column during a secondary collision, and a support arm portion supporting the telescopic friction plate, and a jerking portion provided on a surface facing a rear side; and
an impact absorbing member made of a wire material and having a base portion, a folded portion folded back to an outside in a radial direction of the inner column and to a front side from an end portion of the rear side of the base portion, and an extending portion extending to the front side from an end portion of the folded portion on the outside in the radial direction of the inner column;
wherein
the base portion is attached to the inner column so as to displace together with the inner column when the inner column displaces forward, and the folded portion faces the jerking portion in the front-rear direction,
the folded portion is composed of a pair of folded portions, and the extending portion is composed of a pair of extending portions, and end portions of the pair of folded portions on an inside in the radial direction of the inner column are connected by the base portion, and
the inner column has notch portions at two positions in end portions on the front side that are separated in a circumferential direction thereof, the base portion of the impact absorbing member has bent portions that are bent at right angles from the end portions on the front side of the pair of folded portions, and a connecting portion that connects together end portions of the bent portions, and the bent portions engage with the notch portions.

14. A steering column device according to claim 13 comprising
an intermediate column in which an end portion on the rear side is fitted to an end portion on the front side of the outer column so that displacement rearward is not possible, and a lower column in which an end portion on the rear side is fitted to an end portion on the front side of the intermediate column so that displacement rearward is possible in a case where a rearward impact load is applied due to a primary collision.

* * * * *